(12) United States Patent
Taccogna

(10) Patent No.: US 10,190,437 B2
(45) Date of Patent: Jan. 29, 2019

(54) TEST BENCH FOR AN AIRCRAFT TURBOJET ENGINE, WITH SHUTTERS

(71) Applicant: Techspace Aero S.A., Herstal (Milmort) (BE)

(72) Inventor: Gaetano Taccogna, Bassenge (BE)

(73) Assignee: Safran Aero Boosters S.A. (BE)

( * ) Notice: Subject to any disclaimer, the term of this patent is extended or adjusted under 35 U.S.C. 154(b) by 249 days.

(21) Appl. No.: 15/062,734

(22) Filed: Mar. 7, 2016

(65) Prior Publication Data

US 2016/0290155 A1 Oct. 6, 2016

(30) Foreign Application Priority Data

Mar. 30, 2015 (BE) .................................. 2015/5197

(51) Int. Cl.
| | |
|---|---|
| *F01D 21/00* | (2006.01) |
| *A62C 2/10* | (2006.01) |
| *A62C 2/14* | (2006.01) |
| *G01M 15/14* | (2006.01) |
| *F01D 25/28* | (2006.01) |
| *B64F 5/60* | (2017.01) |

(Continued)

(52) U.S. Cl.
CPC ............... *F01D 21/003* (2013.01); *A62C 2/10* (2013.01); *A62C 2/14* (2013.01); *B64F 5/60* (2017.01); *F01D 25/285* (2013.01); *G01M 15/14* (2013.01); *A62C 3/08* (2013.01); *B64D 27/16* (2013.01); *F05D 2260/83* (2013.01)

(58) Field of Classification Search
CPC ........ F01D 21/003; F01D 25/285; B64F 5/60; B64F 27/16; A62C 2/10; A62C 2/14; A62C 3/08; A62C 2/18; G01M 15/14; B64D 27/16; F05D 2260/83

USPC ......... 73/116.01–116.03; 454/342, 369, 357; 236/49.2; 169/48

See application file for complete search history.

(56) References Cited

U.S. PATENT DOCUMENTS

| | | | | |
|---|---|---|---|---|
| 6,761,629 | B1* | 7/2004 | Parker | F01D 11/00 114/211 |
| 2011/0138772 | A1* | 6/2011 | Zitouni | F01D 25/30 60/226.1 |
| 2017/0216637 | A1* | 8/2017 | Raimarckers | A62C 2/14 |

FOREIGN PATENT DOCUMENTS

| | | | | |
|---|---|---|---|---|
| DE | 2342531 A1 * | 2/1975 | | A62C 2/12 |
| EP | 2336507 A1 | 6/2011 | | |

(Continued)

OTHER PUBLICATIONS

European Search Report from corresponding Belgium Application No. BE 201505197, dated Nov. 27, 2015.

*Primary Examiner* — Lisa Caputo
*Assistant Examiner* — Irving A Campbell
(74) *Attorney, Agent, or Firm* — Sandberg Phoenix & von Gontard P.C.

(57) ABSTRACT

A test bench for an aircraft turbojet engine is provided. The test bench comprises a U-shaped configuration with a passage in the form of an elongated corridor, an inlet duct, and an outlet duct. The corridor comprises a fixing zone with a fixing arm for holding a turbojet engine during testing. The passage furthermore has an upstream shutter with vertical pivoting air guides and a downstream shutter with an inflatable balloon in a collector tube. In the event of fire, the shutters close to confine the turbojet engine in order to suffocate the fire rapidly. A method for managing a fire in a test bench with a passage is also provided. Shutters are placed in the passage, where they deploy.

17 Claims, 3 Drawing Sheets

(51) Int. Cl.
    *B64D 27/16*     (2006.01)
    *A62C 3/08*      (2006.01)

(56) References Cited

FOREIGN PATENT DOCUMENTS

EP    1860416 A2   11/2011
WO    9857093 A1   12/1998

* cited by examiner

TEST BENCH FOR AN AIRCRAFT TURBOJET ENGINE, WITH SHUTTERS

CROSS-REFERENCE TO RELATED APPLICATIONS

This application claims the benefit, under 35 U.S.C. § 119, of BE 2015/5197 filed Mar. 30, 2015, the disclosure of which is incorporated herein by reference in its entirety.

FIELD

The invention concerns tests on aircraft turbojet engines. More particularly, a ground test bench for an aircraft turbojet engine.

BACKGROUND

During the design or maintenance of a turbine engine, various tests are performed in order to validate its correct function. These tests verify the resistance during extended operating phases, by maintaining predefined speeds and forces. During these tests, a series of measurements is made to monitor key parameters. These measures can be performed both directly on the turbine engine or on its environment.

In order to conduct such tests, the turbine engine is installed in a specific test bench. This is adapted to re-create flight conditions while remaining on the ground. Such a test bench has a corridor forming a passage receiving the turbine engine. Vertical ducts delimit the ends of the corridor in order to form an inlet and an outlet, receiving and then injecting the air flow propelled by the turbine engine. Devices reduce the noise nuisance which is inherent in the operation of the turbine engine and propagated via the ducts.

Document EP 1 860 416 A2 discloses a test bench allowing determination of a turbine engine thrust. The test bench has a U-shaped configuration, i.e. it has an inlet duct, an outlet duct, the ducts being connected by a horizontal corridor. Upstream, a first mesh supports the pressure sensors, then a mesh blocks debris at the inlet to the intake mouth of the engine 4. The corridor is partitioned downstream and is completed by a detuner.

During a test, an oil or fuel pipe can rupture. There is then a risk of an engine fire breaking out. Such an event can damage the test bench and in particular its sensors. Naturally, the turbine engine itself can suffer severe damage. The consequences of such an incident lead to major damage which then requires repair, further delaying the possibility of reusing the turbine engine. This scenario becomes paradoxical in the context of an overhaul, since a test is intended to authorize flight of a turbine engine rather than extend delays. Heavy financial losses result from such immobilization on the ground.

SUMMARY

An object of the invention is to solve at least one of the problems posed by the prior art. More precisely, an object of the invention is to reduce the impact of a fire breaking out in the test bench. An object of the invention is also to suffocate as quickly as possible a fire which breaks out in a test bench for a turbine engine.

It will be understood that an object of the invention is a test bench comprising a flow corridor intended to receive an engine, in particular a turbine engine, the bench being fitted with at least one and in various instances two shutters. One is placed upstream of the zone intended to receive the turbine engine, the other being placed downstream of the zone.

An object of the invention is also a test bench for an engine, in particular a turbojet or turboprop engine, wherein the test bench comprises an inlet, an outlet, and a passage allowing a circulation of air between the inlet and the outlet. The passage is intended to receive the engine during testing, wherein the passage comprises at least one movable shutter able to cut off the circulation of air between the inlet and the outlet so as to be able to suffocate a fire occurring in the passage at the engine.

According to various advantageous embodiments of the invention, the shutter comprises a movable part which is delimited by the passage and which is able to seal the passage.

According to various advantageous embodiments of the invention, the shutter comprises portions which are movable relative to each other during the opening and/or closing movements of the shutter, the portions coming into contact with each other and/or moving apart from each other.

According to various advantageous embodiments of the invention, the shutter comprises at least one movable portion which is configured to pivot between the open position and the closed position of the shutter.

According to an advantageous embodiment of the invention, the passage comprises a corridor intended to receive the engine, and/or vertical ducts, in various instances the shutter being situated in the corridor.

According to various advantageous embodiments of the invention, the shutter comprises articulated air guides, in the open position the guides are parallel to a same plane so as to be able to guide the circulation of air parallel to the passage. The aspect "parallel to the passage" can be understood as parallel to the walls—for instance vertical—of the passage.

According to various advantageous embodiments of the invention, the shutter comprises articulated air guides, in the open position the guides are parallel to the main elongation of the passage, and/or in the closed position the guides are inclined relative to the main elongation. The main elongation can be the main straight line inside the passage.

According to various advantageous embodiments of the invention, the guides are chamfered so they can be in plane-to-plane contact with the adjacent guide when the shutter is closed.

According to various advantageous embodiments of the invention, the shutter comprises an inflatable element, for example a balloon.

According to various advantageous embodiments of the invention, it comprises a gas supply means, such as a pump and/or a reservoir, for inflating the inflatable element.

According to various advantageous embodiments of the invention, the passage comprises a collector tube able to collect an air flow driven by the engine, for example for a detuner, the inflatable element being placed at the level of the tube so as to be able to seal the tube.

According to various advantageous embodiments of the invention, the collector tube comprises a tubular portion configured to protrude towards the engine, in various instances the bench comprises a partition across the passage, the tubular portion protruding relative to the partition.

According to various advantageous embodiments of the invention, the shutter comprises an elastic envelope, the modulus of elasticity of the envelope being between 1 MPa and 100 MPa, e.g., between 2 MPa and 40 MPa, in some cases between 5 MPa and 20 MPa.

According to various advantageous embodiments of the invention, the shutter is a first shutter, the passage also comprising a second shutter able to cut off the circulation of air between the inlet and the outlet of the passage, the shutters being configured to define an enclosure around the engine so as to be able to suffocate a fire occurring in the passage.

According to various advantageous embodiments of the invention, the passage comprises a fixing zone for the engine to be tested, the zone being placed between the two shutters, e.g., the fixing zone comprises a fixing arm such as a descending post.

According to various advantageous embodiments of the invention, the passage comprises a main direction for the circulation of air from the inlet towards the outlet, in various instances the main direction follows the central axis of the passage.

According to various advantageous embodiments of the invention, the shutter is movable between an open position and a closed position.

According to various advantageous embodiments of the invention, the passage comprises concrete walls, in particular concrete reinforced with a metal grid, and in some cases foundations.

According to various advantageous embodiments of the invention, the passage and/or the corridor measures more than 10 m in length, for example more than 20 m, e.g., more than 70 m. The length of the corridor can be measured in a straight line.

According to various advantageous embodiments of the invention, the passage has a clear cross section greater than 4 m2, for example greater than 25 m2, e.g., greater than 50 m2, in some cases greater than 100 m2.

According to various advantageous embodiments of the invention, the test bench comprises a fixing arm, in some cases a bracket or suspension post, intended for fixing the engine.

According to various advantageous embodiments of the invention, the engine is able to exert a thrust greater than or equal to 20 kN, for example greater than or equal to 80 kN, e.g., greater than or equal to 200 kN, in some cases greater than or equal to 500 kN. The fixing arm is designed to receive the corresponding forces.

According to various advantageous embodiments of the invention, the shutter is movable between a retracted configuration and a deployed configuration in which it cuts the circulation of air in the passage between the inlet and the outlet.

An object of the invention is also a method for managing a fire in a test bench for an engine, in particular for a turbojet or turboprop engine, the test bench comprising a passage in which the engine is fixed in order to be tested, distinguished in that the test bench comprises a shutter able to close the passage, and in that in the event of fire, the shutter is deployed from the passage.

According to an advantageous embodiment of the invention, in the normal operating state, in particular in the absence of fire, the shutter is placed in the passage and has an open configuration allowing a circulation of air via the passage.

According to an advantageous embodiment of the invention, the shutter comprises an inflatable element which is deployed in the passage by inflation in the event of fire, and where applicable the inflatable element is continuously supplied with inflation fluid.

According to an advantageous embodiment of the invention, in the event of fire, the shutter is filled with a neutral gas.

In general, the advantageous embodiments of each object of the invention are also applicable to the other objects of the invention. As far as possible, each object and each advantageous embodiment can be combined.

The presence of the portion of the shutter which pivots allows an improvement in compactness and limits its impact on the flow circulating in the test bench. In the open position, each shutter is partially or in various instances fully housed in the passage, in particular the corridor, which allows it to seal this even more quickly.

The presence of a guide allows the use of elements necessary for guiding flow. They are immersed therein during normal operation. Consequently, their change of configuration is more rapid. Pivoting through a fraction of a turn is sufficient to close the passage. Five seconds are sufficient for a shutter to be formed.

An inflatable element benefits from a low inertia. Its flexible envelope can adapt to the surfaces of the passage with which it cooperates. The flexible material intrinsically offers a true seal inside the passage. Inflation can take place in a few seconds, increasing the safety of the bench. The two shutters can be operated automatically. The adhesion of the inflatable element due to friction allows its resistance to the thrust of the flow driven by the turbojet engine. This resistance is applied during the auto-rotation time of the turbojet engine, as well as resistance to temperatures of the order of 300° C.

Two shutters allow tight confinement of a reduced zone so as to accelerate the suffocation of a fire which breaks out therein. They are placed close to the turbojet engine, which limits the quantity of oxygen remaining in the resulting enclosure. This further accelerates suffocation of the fire.

DRAWINGS

DETAILED DESCRIPTION

Figure 1:
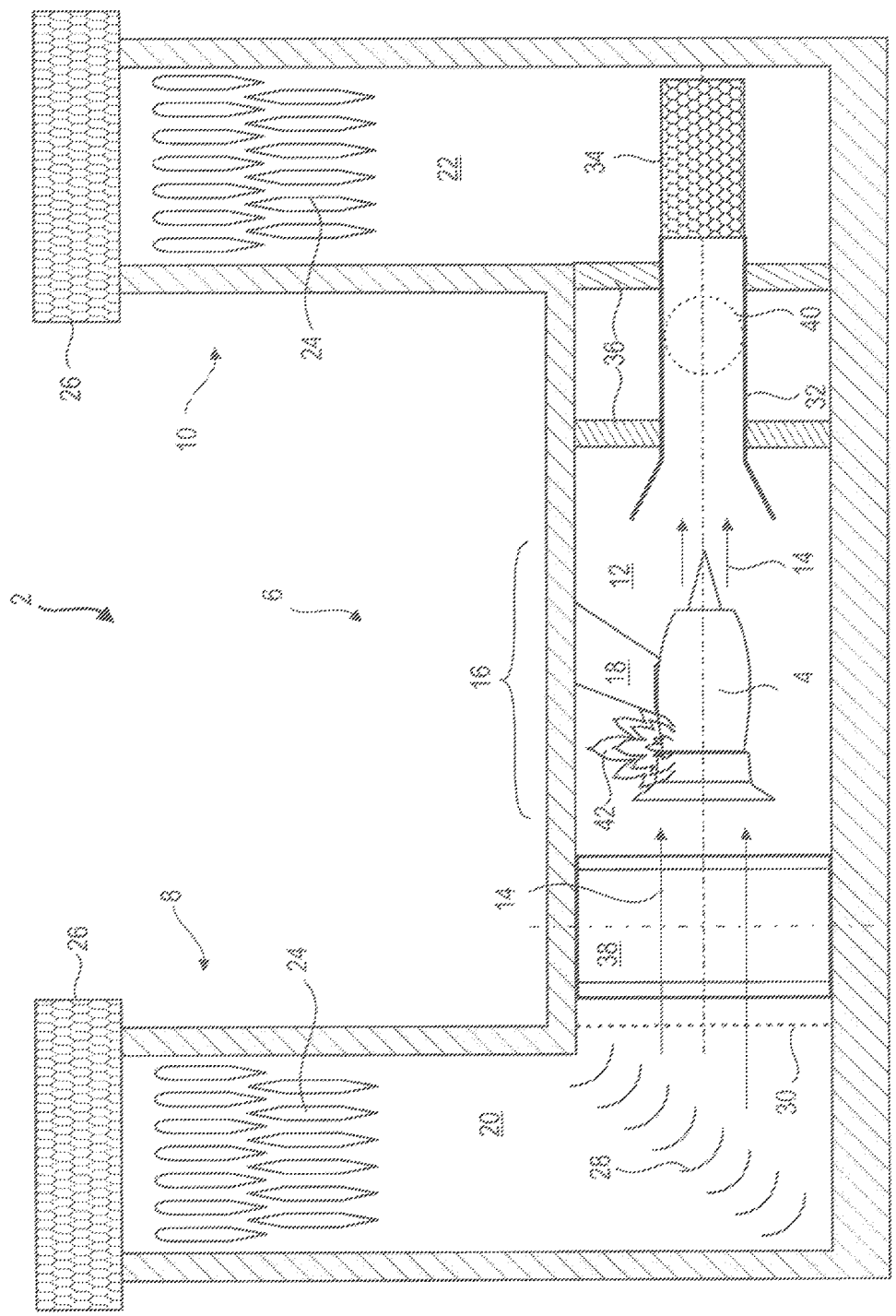
FIG. 1 shows a test bench receiving an engine to be tested, in accordance with various embodiments of the invention.

FIG. 1 shows in a simplified form a test bench 2 for an engine 4, for example a test bench 2 for a turbine engine 4, for example an aircraft turbojet engine 4.

The test bench 2 forms an infrastructure or construction. It comprises a passage 6 with an inlet 8 and an outlet 10. The passage 6 can comprise an essentially elongated corridor 12. A length of the corridor can be greater than 10 m, for example greater than 30 m, for example greater than 50 m. The length of the corridor 12 allows the straight circulation of an air flow 14 or air circulation 14, limiting turbulence. In order to limit the flow resistance, in particular the entry of an air flow 14 into the turbojet engine 4, the corridor 12 can have a clear cross-section that is greater than or equal to 20 m², for example greater than or equal to 50 m². The clear cross-section or free cross-section can be measured upstream of a fixing zone 16 intended to receive the turbojet engine 4. The clear cross-section can be observed over at least one-quarter of the length of the corridor 12, for instance over the majority thereof.

The corridor 12 can have the fixing zone 16 that can be fitted with a fixing arm 18 where the turbojet engine 4 is mounted. The arm 18 can extend vertically from the ceiling of the corridor 12, in the manner of a column or post. The arm 18 allows the turbojet engine 4 to be mounted with an offset, and be centred in the middle of the corridor 12. The centring is vertical and horizontal.

The corridor 12 can be delimited by vertical ducts 20 and 22 at the inlet 8 and outlet 10. The ducts 20 and 22 allow a vertical air intake and outlet at a height. To reduce sound nuisance, the ducts 20 and 22 can comprise sound baffles 24 or acoustic plates 24 to absorb the sound waves. Further devices 26 can be present at the inlet 8 and outlet 10, to prevent flow inversions which would disrupt the test conditions. The U-shaped configuration presented here is not essential; other configurations, for example without ducts, can be considered. A chamber alone can form the passage 6.

At the junction between the upstream duct 20 and the corridor 12, the bench is equipped with a series of deflection plates 28. The deflection plates 28 allow the air descending from the inlet duct 20 to be deflected in a horizontal direction. The deflection plates 28 extend horizontally and across the entire corridor 12. The deflection plates 28 have curved profiles. At the inlet to the corridor 12, the bench 2 optionally has a mesh 30 to intercept debris liable to disrupt the test and damage the turbojet engine.

Downstream of the turbojet engine 4, the bench 2 comprises a collector tube 32 collecting the air flow 14 propelled by the turbojet engine, or engine's exhaust gases. The mouth of the collector tube 32 can form a funnel or cone downstream. The collector tube 32 helps absorb the noise created by the test. The collector tube 32 is arranged horizontally and at its outlet comprises a diffuser 34 in the outlet duct 22.

The collector tube 32 can be held in the bench via at least one partition 36, in various instance two partitions 36. These partitions 36 extend vertically and transversely in the corridor 12. One partition 36 can form a separation between the corridor 12 and the outlet duct 22. The partitions form sealed separations which allows the flow 14 from the turbojet engine 4 to be contained.

In order to contain a fire which can occur at the turbojet engine 4, the test bench is equipped with an upstream shutter 38 and/or a downstream shutter 40. The downstream shutter 40 is exemplarily shown here in the closed position with dotted lines. Two shutters 38 and 40 are shown, in various embodiments, only one shutter 38 or 40 is necessary in the sense of the invention, since a sprinkler can also be used in combination to extinguish a fire 42.

Figure 2:
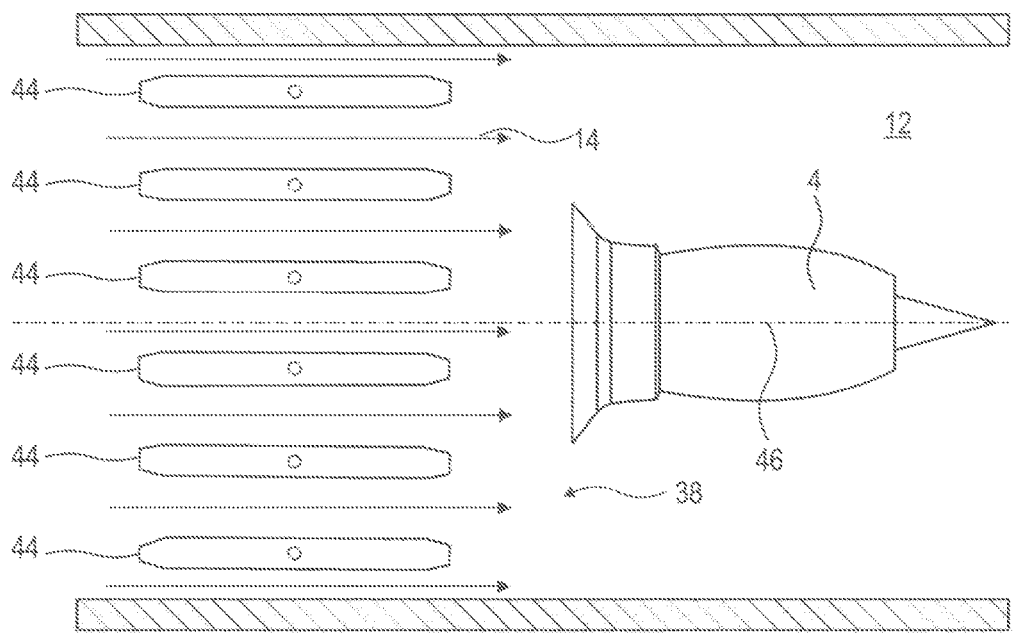
FIG. 2 is a diagram of an upstream shutter in the open position, in accordance with various embodiments of the invention.

FIG. 2 is a view from above of the upstream shutter 38 in the open position. A portion of the corridor 12 and the turbojet engine 4 are shown. The bench 2 is functioning in normal test conditions in the usual fashion.

The upstream shutter 38 comprises air guides 44 to guide the air flow 14 axially relative to the axis 46 of the turbojet engine 4. These air guides 44 are articulated such that they can pivot around vertical axes. Alternatively, they can be horizontal and be articulated pivotingly around horizontal axes.

Figure 3:
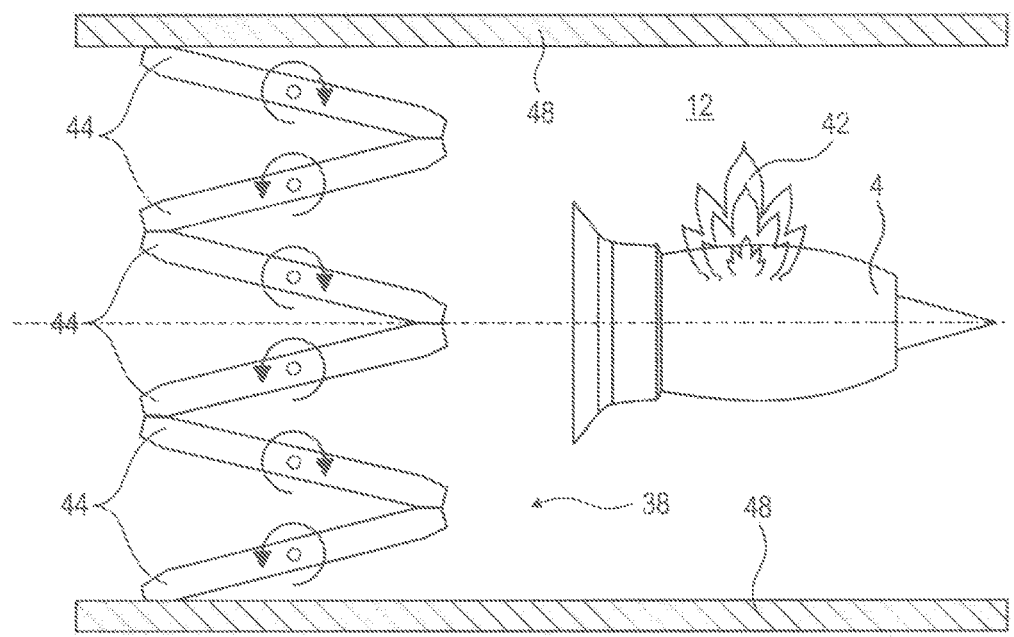
FIG. 3 is a diagram of the upstream shutter in the closed position, in response to a fire, in accordance with various embodiments of the invention.

The air guides 44 are spaced laterally and are exemplarily shown in FIG. 2 being parallel to each other. The air guides 44 form a row. The air guides 44 are also parallel to a same plane, which allows the guidance or orientation of air flow towards the turbojet engine. The guides 44 allow limitation and, in various instances, suppression of the turbulence which can persist in the flow because of its speed. FIGS. 2 and 3 exemplarily illustrate six guides 44 are, however, it is envisioned that any other number of guides 44 could be implemented, such as fifteen or thirty.

FIG. 3 is a view from above of the upstream shutter 38 in the closed position. A portion of the corridor 12 and the turbojet engine 4 are shown. The upstream shutter 38 is in the closed position because of the start of the fire 42, which corresponds to an unusual or abnormal operation of the bench.

In order to pivot into the closed position, the guides 44 pivot towards each other until they meet. The guides 44 turn through a turn fraction of less than one-eighth of a turn, in various instances less than one-sixteenth of a turn. The guides 44 come into contact along their upstream and downstream edges, in various instances over their entire height. Motors and linkages actuate the guides 44.

When closed, the guides 44 describe a zigzag or sawtooth pattern. The guides 44 are divided into two sets of guides 44, positioned alternately. The sets of guides 44 turn in opposite directions, e.g., one set turns clockwise and the other set turns anticlockwise. The guides 44 of one set become parallel to a first plane, the guides 44 of the other set become parallel to a second plane which is inclined relative to the first plane.

Their upstream and downstream contacts can be essentially tight, as is the contact between the lateral guides 44 and the walls 48 of the corridor 12. To optimize this aspect, in various embodiments the guides are advantageously chamfered in order to form plane-to-plane contacts with adjacent chamfers. The chamfers can have joints. Also, the chamfers improve the aerodynamics.

In some cases, the deflection plates 28 of the bench 2 are articulated and can form a shutter by turning until they come into contact, for example tightly, with each other. The sound baffles can also be articulated so as to form shutters.

Figure 4:
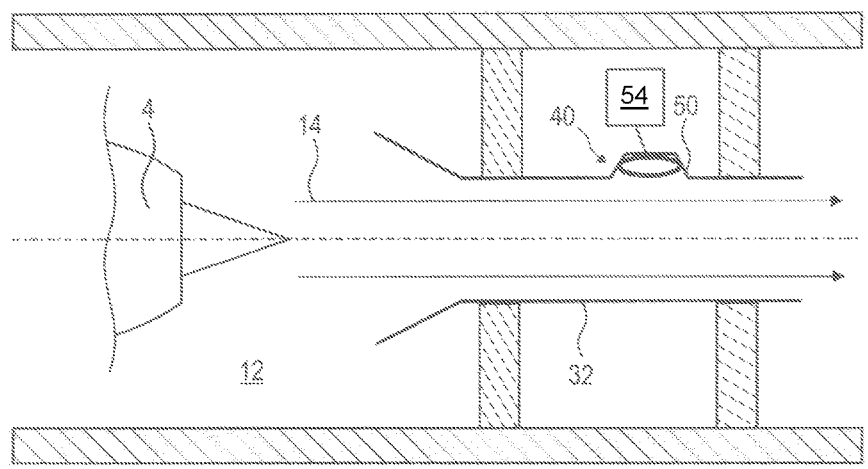
FIG. 4 is a diagram of a downstream shutter in the open position, in accordance with various embodiments of the invention.

FIG. 4 depicts an enlargement of the downstream shutter 40 in the open position which allows the circulation of a flow. A downstream part of the turbojet engine 4 and the collector tube 32 are shown.

The downstream shutter 40 is placed in the corridor 12 at the level of the tube 32, downstream of the turbojet engine 4. The downstream shutter 40 can be an inflatable element 40 such as a bladder or a balloon 40. In the open position or configuration, it can be housed in a niche 50, for example in the upper part of the tube 32. This niche 50 allows the downstream shutter 40 to be held retracted relative to the air flow 14 in the tube 32, so as not to decelerate the flow.

Figure 5:
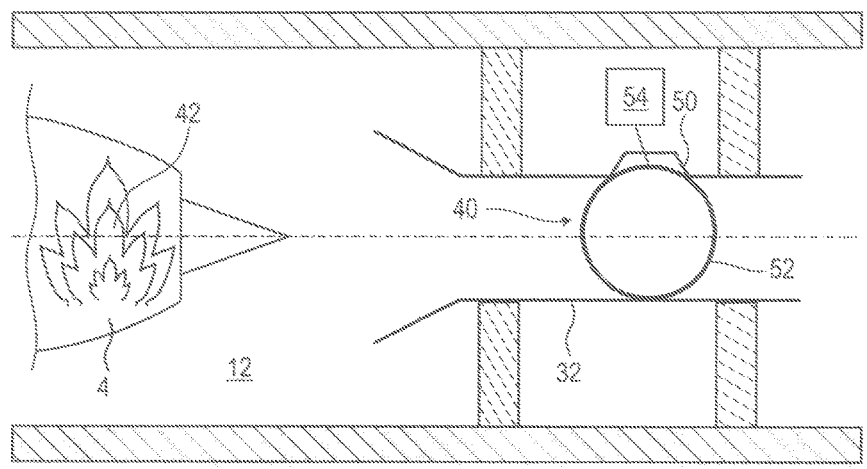
FIG. 5 is a diagram of a downstream shutter in the closed position, in response to a fire, in accordance with various embodiments of the invention.

FIG. 5 depicts an enlargement of the downstream shutter 40 in the closed position following the start of a fire 42. A portion of the corridor 12 and the turbojet engine 4 are shown.

The downstream shutter 40 is deployed across the clear cross-section of the tube 32. It can comprise a flexible envelope 52, allowing deformation between a retracted configuration and the deployed configuration. The envelope 52 can be elastic and expand on inflation of the shutter 40. The envelope 52 can comprise a silicone elastomer and/or polyurethane and/or rubber envelope. These materials can be reinforced mechanically and/or thermally.

In the inflated configuration, the shutter 40 can be spherical or have any other form corresponding to that of the tube 32. The shutter 40 is adapted to seal the tube 32 tightly, in order to prevent the renewal of air around the turbojet engine 4.

The inflation of the shutter 40 can be achieved using a neutral gas. Such a gas can contribute to suffocating the flames in the case of leakage. The gas is pressurised in order to retain the sealing form of the shutter 40. For inflation, the bench 2 can comprise gas supply means 54 with conduits, a pump or a reservoir such as a cylinder. The gas supply means 54 are advantageously placed outside the tube 32, in some cases outside the corridor 12.

The tube 32 can have a square profile, and not be exclusively circular. The upstream shutter 40 can block the passage in a few seconds, which allows very quick action. It does not require an operation of displacement or equipment release. A simple manual control can provoke inflation, as can a fire sensor connected to the supply means 54.

When the fire 42 is under control, each shutter is retracted. The guides can resume an open, parallel configuration. The inflatable element 40 can be deflated such that it again allows passage through the tube 32. Suction or actuation can allow retraction of the shutter 40, for example into its niche 50. The guides 44 can also resume an arrangement parallel to the corridor axis 46.

What is claimed is:

1. A test bench for a turbojet engine, said test bench comprising:
    an inlet;
    an outlet;
    a passage allowing a circulation of air between the inlet and the outlet, the passage structured and operable to receive a turbojet engine for testing;
    the passage comprises at least one tight movable shutter comprising an inflatable element, the at least one tight movable shutter is structured and operable to cut off the circulation of air between the inlet and the outlet and to suffocate a fire occurring in the passage at the turbojet engine.

2. The test bench of claim 1, wherein the at least one tight moveable shutter comprises a movable part delimited by the passage and structured and operable to seal the passage.

3. The test bench of claim 1, wherein the at least one tight moveable shutter comprises portions movable relative to each other during opening and closing movements of the shutter.

4. The test bench of claim 1, wherein the at least one tight moveable shutter comprises at least one movable portion structured and operable to pivot between an open position and a closed position of the shutter.

5. The test bench of claim 1, wherein the passage comprises a corridor structured and operable receive the turbojet engine and vertical stacks, the at least one tight moveable shutter being disposed in the corridor.

6. The test bench of claim 1, wherein the at least one tight movable shutter comprises articulated air guides, wherein in an open position the articulated air guides are parallel to a same plane so as to guide the circulation of air parallel to the passage.

7. The test bench of claim 6, wherein the articulated air guides are chamfered such that each articulated air guide can be in plane-to-plane contact with an adjacent guide when the at least one tight moveable shutter is closed.

8. The test bench of claim 1, wherein the at least one tight moveable shutter comprises articulated air guides, wherein in an open position the articulated air guides are parallel to a main length of the passage, and in a closed position the articulated air guides are inclined relative to the main elongation.

9. The test bench of claim 1 further comprising a gas supply means for inflating the inflatable element.

10. The test bench of claim 1, wherein the passage comprises a collector tube structured and operable to collect an air flow driven by the turbojet engine, the inflatable element being placed at the level of the collector tube whereby the inflatable element can seal tube.

11. The test bench of claim 10, wherein the collector tube comprises a tubular portion configured to protrude towards the turbojet engine, the test bench comprises a wall across the passage supporting the tubular portion, the tubular portion protruding relative to the wall.

12. The test bench of claim 1, wherein the at least one tight moveable shutter comprises a resilient envelope having an elasticity modulus between 1 MPa and 100 MPa.

13. The test bench of claim 1, wherein the at least one tight moveable shutter is a first shutter and the passage further comprises a second shutter able to cut off the circulation of air between the inlet and the outlet of the passage, the first and second shutters configured to define an enclosure around the turbojet engine and are structured and operable to suffocate a fire occurring in the passage.

14. The test bench of claim 13, wherein the passage comprises a fixing zone for the turbojet engine to be tested, the fixing zone being disposed between the first shutter and the second shutter.

15. A method for managing a fire in a test bench for a gas turbine engine, wherein the test bench comprises a passage in which the gas turbine engine can be fixed for testing of the turbine engine, and a shutter disposed in the passage, said method comprising:
    deploying the shutter to close the passage in the event of fire within the passage; and
    deploying the shutter in an open configuration, allowing a circulation of air through the passage, when in a normal operating state.

16. A method for managing a fire in a test bench for a gas turbine engine, wherein the test bench comprises a passage in which the gas turbine engine can be fixed for testing of the turbine engine, and a shutter disposed in the passage, said method comprising:
    deploying the shutter to close the passage in the event of fire within the passage,
    wherein the shutter comprises an inflatable element, and the method further comprising deploying the inflatable element within the passage, via a continuously supplied inflation fluid, in the event of a fire within the passage.

17. The method of claim 16, wherein deploying the inflatable element comprises filling the inflatable element with a neutral gas.

* * * * *